US010754392B2

(12) United States Patent
Wendt

(10) Patent No.: US 10,754,392 B2
(45) Date of Patent: Aug. 25, 2020

(54) FRICTION HINGE WITH CLUTCH-BASED RESISTANCE

(71) Applicant: Microsoft Technology Licensing, LLC, Redmond, WA (US)

(72) Inventor: Nicholas Benjamin Wendt, Seattle, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 15/690,187

(22) Filed: Aug. 29, 2017

(65) Prior Publication Data

US 2019/0064886 A1    Feb. 28, 2019

(51) Int. Cl.
G06F 1/16    (2006.01)

(52) U.S. Cl.
CPC .......... G06F 1/1681 (2013.01); G06F 1/1679 (2013.01); *E05Y 2900/606* (2013.01)

(58) Field of Classification Search
None
See application file for complete search history.

(56) References Cited

U.S. PATENT DOCUMENTS

| | | | | |
|---|---|---|---|---|
| 5,566,424 A | * | 10/1996 | Crompton | G06F 1/1601 16/337 |
| 5,737,194 A | * | 4/1998 | Hopkins | H05K 7/1461 361/728 |
| 5,771,540 A | | 6/1998 | Carpenter et al. | |
| 6,185,109 B1 | * | 2/2001 | Koradia | H05K 7/1425 174/363 |
| 6,438,798 B1 | | 8/2002 | Chene et al. | |
| 6,754,081 B2 | | 6/2004 | Rude et al. | |
| 6,899,311 B1 | * | 5/2005 | Ternus | F16M 11/10 248/454 |
| 7,540,466 B2 | * | 6/2009 | Yang | F16M 11/10 248/126 |
| 7,581,290 B2 | | 9/2009 | Chang | |

(Continued)

FOREIGN PATENT DOCUMENTS

CN    103726734 A    4/2014

OTHER PUBLICATIONS

International Search Report and Written Opinion Issued in PCT Application No. PCT/US2018/038661, dated Oct. 10, 2018, 13 Pages.

*Primary Examiner* — Courtney L Smith
*Assistant Examiner* — Rashen E Morrison
(74) *Attorney, Agent, or Firm* — Ray Quinney & Nebeker P.C.; Paul N. Taylor

(57) ABSTRACT

A hinge includes a shaft, a hinge leaf engaged with the shaft, a band clamped around the shaft for rotation about the shaft and pivotal movement relative to the hinge leaf, and a clutch disposed between the band and the shaft. The clutch includes a collar disposed between the shaft and the band. The clutch is configured to lock and unlock the collar to the shaft. Rotation of the band about the shaft in a first direction locks the collar to the shaft for frictional movement of the band about the shaft at a first resistance level. Rotation of the band about the shaft in a second direction unlocks the collar from the shaft for frictional movement of the band about the shaft at a second resistance level lower than the first resistance level.

20 Claims, 13 Drawing Sheets

(56) References Cited

U.S. PATENT DOCUMENTS

| | | | |
|---|---|---|---|
| 7,937,810 B2* | 5/2011 | Hu | G06F 1/1601 |
| | | | 16/241 |
| 8,382,059 B2* | 2/2013 | Le Gette | F16M 11/10 |
| | | | 248/460 |
| 8,453,299 B2* | 6/2013 | Li | G06F 1/1624 |
| | | | 16/257 |
| 8,693,192 B2* | 4/2014 | Hsieh | G06F 1/166 |
| | | | 248/460 |
| 8,922,995 B2* | 12/2014 | Su | F16M 11/10 |
| | | | 248/917 |
| 9,292,049 B1 | 3/2016 | Woodhull et al. | |
| 9,353,560 B2 | 5/2016 | Sprenger et al. | |
| 9,404,298 B1* | 8/2016 | Chen | G06F 1/1681 |
| 9,411,365 B1 | 8/2016 | Tanner et al. | |
| 9,518,414 B1* | 12/2016 | Chen | G06F 1/1681 |
| 9,857,022 B2* | 1/2018 | Liu | F16M 11/38 |
| 2006/0272128 A1 | 12/2006 | Rude | |
| 2006/0285916 A1 | 12/2006 | Lu et al. | |
| 2007/0186382 A1 | 8/2007 | Huang | |
| 2014/0262933 A1* | 9/2014 | Lockwood | A45C 11/00 |
| | | | 206/762 |
| 2015/0092335 A1 | 4/2015 | Patrick et al. | |
| 2016/0097227 A1* | 4/2016 | Hsu | G06F 1/16 |
| | | | 16/354 |
| 2017/0068283 A1 | 3/2017 | Liang et al. | |

\* cited by examiner

FRICTION HINGE WITH CLUTCH-BASED RESISTANCE

BACKGROUND

Electronic devices often have hinges to support different device configurations and orientations. For instance, hinges are used in notebook computers and other devices to attach a display to a base in a clamshell arrangement. Other computing devices have hinges to position a kickstand used to prop up the device on, for instance, a desktop. Hinges are thus often used to adapt handheld and other mobile devices for other usage scenarios.

DESCRIPTION OF THE DRAWING FIGURES

For a more complete understanding of the disclosure, reference is made to the following detailed description and accompanying drawing figures, in which like reference numerals may be used to identify like elements in the figures.

Figure 1:
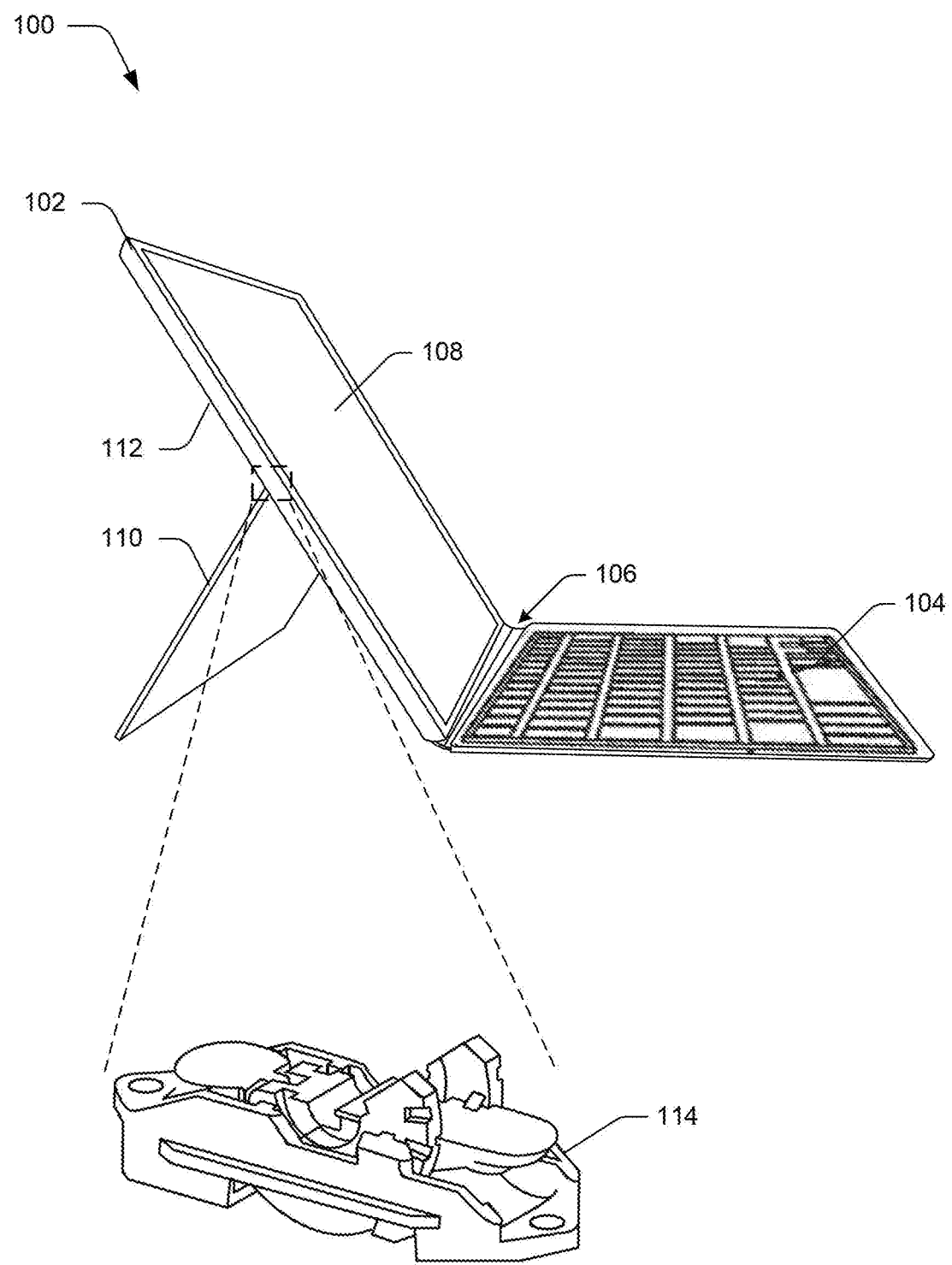
FIG. 1 is an illustration of an electronic device in which a friction hinge with clutch-based resistance may be incorporated in accordance with one example.

The embodiments of the disclosed devices may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION

Friction hinges with low or lower closing resistance levels are described. The friction hinges may thus have different opening and closing resistance levels. The lower closing resistance level allows the hinge to be closed with a lower amount of torque than used to open the hinge. In examples involving a hinged kickstand or a cover, closing the cover or kickstand does not involve the same effort as involved in opening the kickstand or cover. A lower closing resistance may be convenient for the user. A higher opening resistance level may be useful for device stability. Other advantages or disadvantages of differing resistance levels may also or alternatively be applicable.

The level of closing resistance is established or regulated by a clutch or other locking mechanism. The locking mechanism establishes the low or lower closing resistance level, while maintaining a high or higher opening resistance level. In some cases, components of the clutch are incorporated into, or otherwise integrated with, a shaft of the friction hinge. For instance, a collar may be disposed about the shaft to provide a roller clutch or other one-way clutch.

The difference between the opening and closing resistance levels may be tuned or otherwise established by the width of the locking mechanism. For instance, the width of the collar may establish the difference in resistance levels. A larger collar covers more of the shaft and, thus, less shaft is presented for friction during closing, thereby leading to lower closing resistance. In some cases, the diameter of the shaft may be stepped down or otherwise decreased to allow for such friction while accommodating the collar. The closing resistance level may thus be tuned to a desired level.

Although described in connection with kickstands of computing devices, the disclosed hinges may be used in connection with a wide variety of electronic devices. For instance, the friction hinges may be used in electronic devices having clamshell arrangements, such as mobile telephones and laptops. The friction hinges are thus not limited to use with particular types of electronic devices. Other aspects of the friction hinges may also vary considerably. For instance, the friction hinges may or may not include a cam and cam follower arrangement, as described in examples herein.

FIG. 1 is an illustration of an example environment 100 in which friction hinges as described herein may be implemented. The illustrated environment 100 includes an example of an electronic device 102 physically and communicatively coupled to an input device 104 via a flexible hinge 106. The electronic device 102 may be configured as a computing device in a variety of ways. For example, the computing device 102 may be configured as a personal computer (PC), tablet or other handheld computing device, laptop or mobile computer, communications device such as mobile phone, multiprocessor system, microprocessor-based system, programmable consumer electronic, minicomputer, or audio or video media player. In some cases, the computing device 102 is a wearable electronic device. For instance, the device may be worn on or attached to a person's body or clothing. The wearable electronic device may be attached to a person's shirt or jacket; worn on a person's wrist, ankle, waist, or head; or worn over their eyes or ears. Such wearable devices may include a watch, heart-rate monitor, activity tracker, or head-mounted display.

While examples are presented herein in the context of a tablet device, the disclosed hinges may be utilized with various other types and form factors of computing or other electronic devices. The computing resources of the electronic device 102 may vary accordingly. For instance, the computing device 102 may range from full resource devices with substantial memory and processor resources, to a low-resource device with limited memory and/or processing resources. Further details regarding examples of the electronic device 102 are set forth below with reference to FIG. 15.

In the illustrated example of FIG. 1, the input device 104 is configured as having an input portion that includes a keyboard having a QWERTY arrangement of keys and a track pad. Other keyboard arrangements may be used. Further, other input device configurations may also be used, such as a game controller, a configuration to mimic a musical instrument, and so forth. Thus, the input device 104 and components or aspects thereof may assume a variety of different configurations to support various functionality.

The electronic device 102 further includes a display 108 and a support component or other stand 110. The display 108 provides a visual user interface for the computing device 102. The display 108 may be carried or mounted in a housing or other chassis 112 of the electronic device 102. Alternative or additional types of visual user interfaces may be provided, including, for instance, virtual image displays.

The support component 110 is rotatably and/or pivotally attached to the chassis 112 via one or more instances of a friction hinge 114. The support component 110 is pivotable via the hinge 114 to different angles relative to the chassis 112. The different angles support different orientations of the electronic device 102. For instance, one or more orientations may be well suited for use of the electronic device 102 on a desktop. Other orientations may be better suited for use on a lap or other surface.

The hinge 114 is depicted generally in FIG. 1. Further details regarding the hinge 114 are provided below in connection with other figures depicting a number of examples. An enlarged side view of the hinge 114 is presented in FIG. 1.

Figure 2:
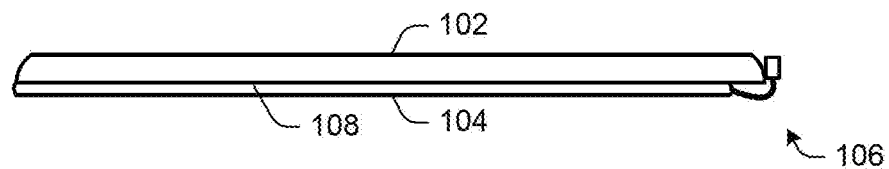
FIG. 2 is side view of the electronic device of FIG. 1 while disposed in an example orientation.

The electronic device 102 may be disposed in a number of different orientations. As shown in FIG. 2, the flexible hinge 106 may be used to rotate the input device 104 to an orientation 200 in which the input device 104 is in contact with the display 108. The input device 104 may thus act as a cover in the orientation 200. In this way, the input device 104 may act to protect the display 108 of the electronic device 102.

Figure 3:
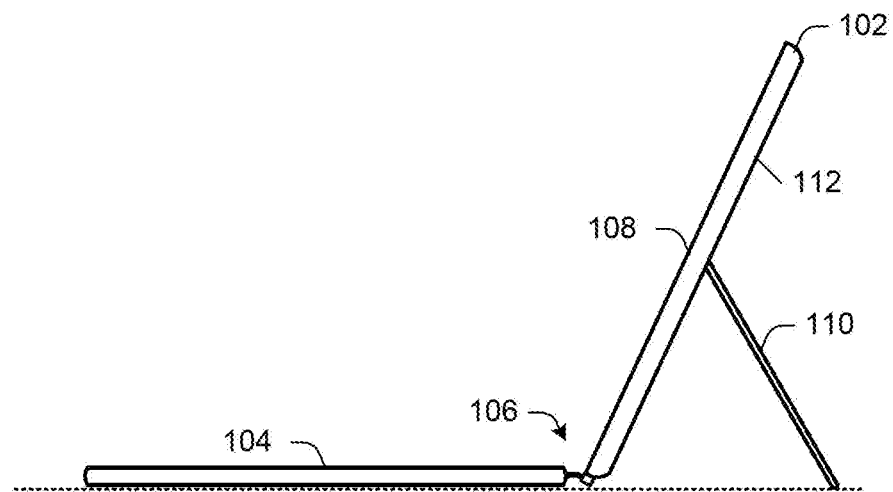
FIG. 3 is a side view of the electronic device of FIG. 1 while disposed in another example orientation.

FIG. 3 depicts another example orientation 300 directed to supporting a typing arrangement. In the orientation 300, the input device 104 is laid flat against a surface and the chassis 112 is disposed at an angle (e.g., relative to the chassis 112) to permit viewing of the display 108. In this example, the support component 110 is positioned to extend outward (e.g., rearward) from the chassis 112. The support component 110 may thus be used or configured as a kickstand or other stand. As described herein, the hinge 114 is used to select the angle or orientation of the support component 110. The support component 110 may thus provide for a number of different orientations for the electronic device 102. Further example orientations involving the support component 110 are described below in connection with FIGS. 4A and 4B.

Figure 4A:
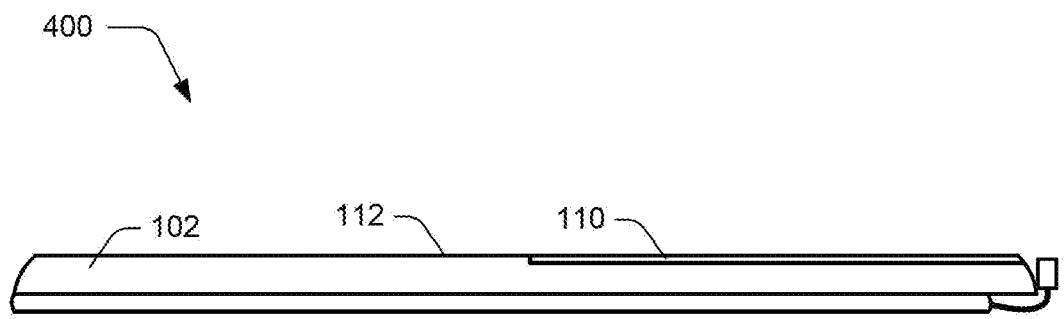
FIG. 4A is a side view of the electronic device of FIG. 1 depicting a support component of the electronic device in a closed orientation in accordance with one example.

FIG. 4A depicts an orientation 400 in which the support component 110 is disposed in a closed position. In this example, the support component 110 forms a portion of the rear surface of the chassis 112 of the electronic device 102. The support component 110 may conform to a surface contour of the chassis 112. When in the closed position, the support component 110 may thus be flush with the remainder of the rear surface, not protruding from a plane formed thereby as shown in FIG. 4A. The support component 110 may be integrated with the electronic device 102 in these and other ways.

Figure 4B:
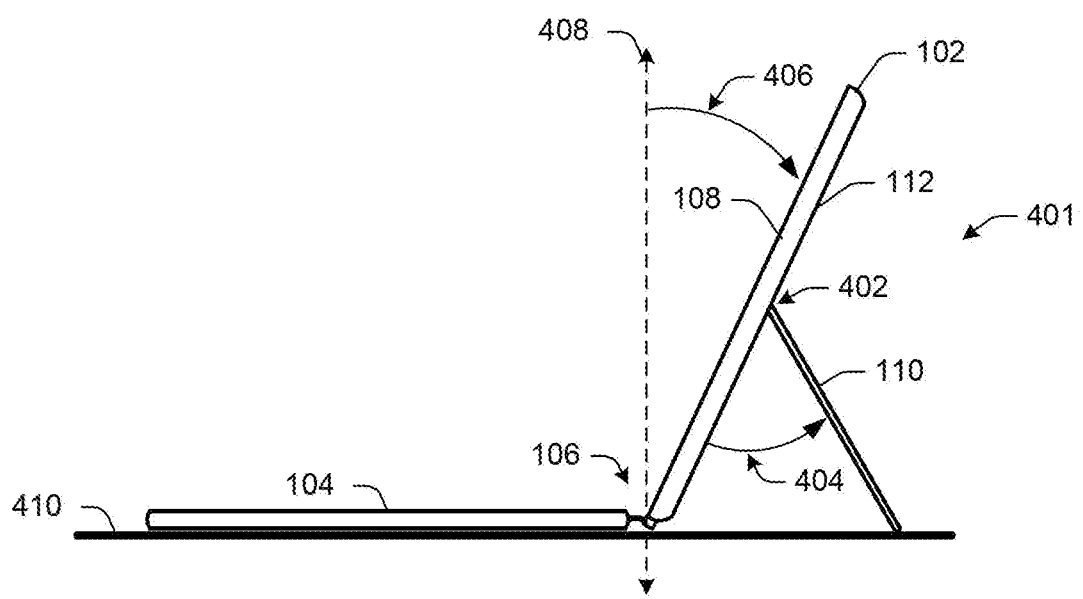
FIG. 4B is a side view of the electronic device of FIG. 1 depicting the support component in an open orientation in accordance with one example.

FIG. 4B depicts an orientation in which the support component 110 is pivoted away from the rear surface 112 of the chassis 112 to a position 401. In this example, the support component 110 is pivotably or rotatably attached to the computing device 102 along a seam 402 via the friction hinge 114 (FIG. 1). In this example, the position 401 establishes an angle 404 between the rear surface of the chassis 112 and the support component 110. The angle 404 may fall in a range from 45 degrees to 55 degrees, but other angles and/or ranges of angles may be supported, including angles considerably greater than the angle 404.

In this example orientation, the position 401 disposes a front surface of the display 108 at an angle 406 relative to a vertical line 408. The vertical line 408 corresponds, for instance, with the normal to a surface 410 on which the electronic device 102 and the support component 110 rests. In the example of FIG. 4B, the angle 406 is approximately 25 degrees. The angle 406 may thus be, for instance, equal to about one-half of the angle 404. Other angles for the display 108 may be supported.

In the orientation illustrated in FIG. 4B, the input device 104 is pivoted or rotated away from the chassis 112 of the electronic device 102 while the computing device 102 is supported (e.g., propped up) by the support component 110. The position 401 may thus orient the electronic device 102 so that a user is capable of viewing the display 108 and providing input via the input device 104. Alternatively, or additionally, the orientation of the position 401 enables a user to interact with a touchscreen of the display 108.

The support component 110 may be rotated away from the chassis or rear surface 112 of the computing device 102 to additional positions other than position 401. In some cases, the support component 110 is rotated further past the position 401. The angle 404 may thus be increased (and/or decreased). In some cases, the angle 404 may vary to any position or angle between a closed and fully open configuration. In other cases, the support component 110 may snap into one or more preset positions.

While FIG. 4B depicts the electronic device 102 with the input device 104, in other examples, the electronic device 102 may be separated from or not include the input device 104. In some cases, the input device 104 may be separated from the electronic device 102. The electronic device 102 may thus be capable of functioning independent of a keyboard or other input device 104 via, for instance, a touchscreen of the display 108. For example, the flexible hinge 106 may employ an attachment mechanism that holds the input device 104 to the computing device 102 via, for instance, a magnetic field. To detach the input device 104, a user may grasp the chassis 112 and the input device 104, and pull the two apart by overcoming the magnetic attraction therebetween.

Figure 5:
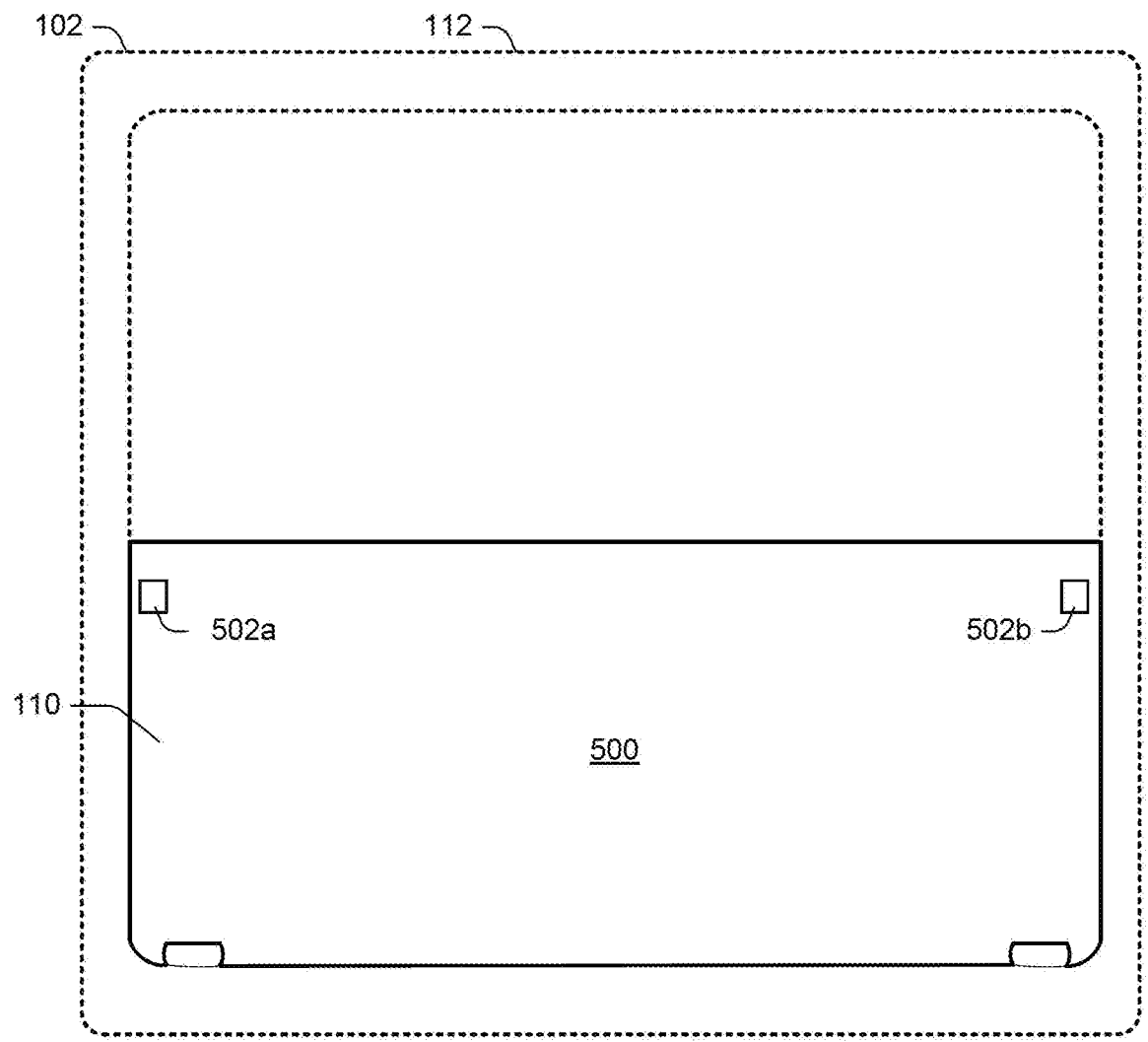
FIG. 5 is a rear, elevational view of the electronic device of FIG. 1 depicting an inner surface of the support component in accordance with one example.

FIG. 5 depicts a view of an inner surface 500 of the support component 110 in accordance with one or more examples. The support component 110 is illustrated in the context of an outline of the chassis 112 of the computing device 102. In this case, the inner surface 500 includes hinge mounts 502a, 502b, each of which provides a mounting location for a respective friction hinge 114 (FIG. 1). The hinge mounts 502a, 502b are configured to attach the support component 110 to the chassis 112. Each hinge mount 502a, 502b may thus connect the chassis 112 and/or the support component 110 to a hinge leaf of the friction hinge(s) 114. Alternatively or additionally, hinge mounts are carried by, or otherwise disposed on, the support component 110. Details regarding the manner in which each friction hinge 114 is mounted or otherwise attached (e.g., via a hinge leaf) to the chassis 112 and the support component 110 are provided in connection with a number of examples described below.

Figure 6:
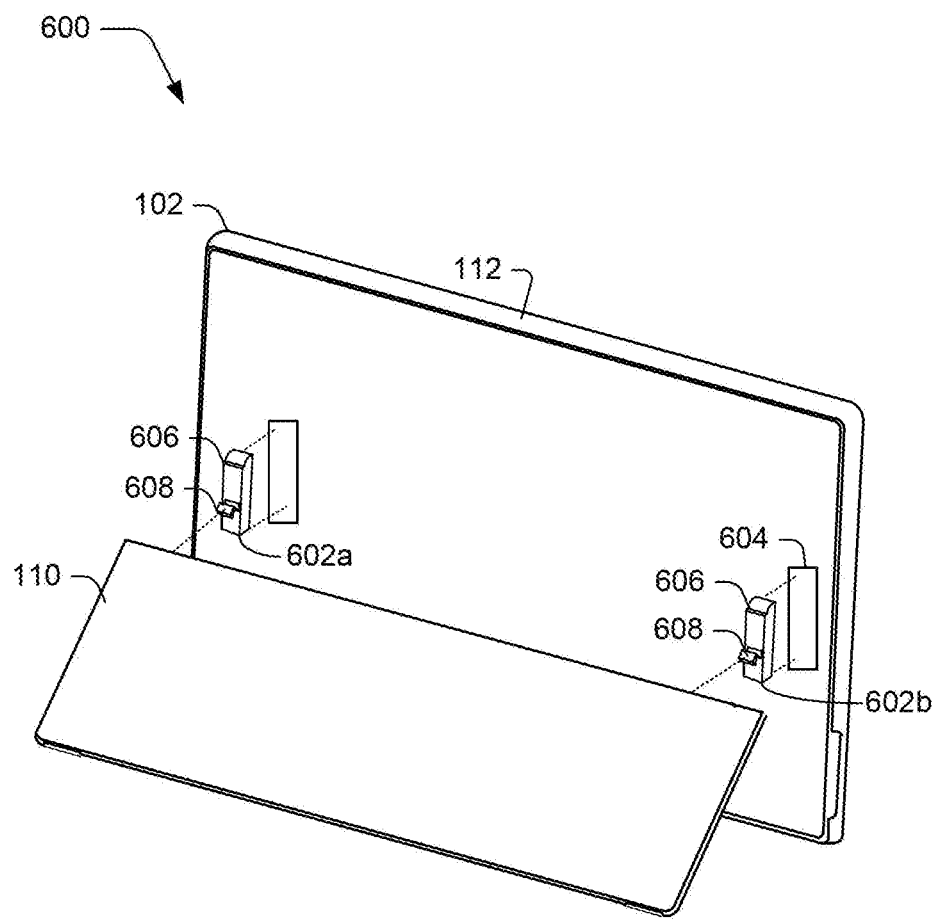
FIG. 6 is an exploded, perspective, rear view of the electronic device of FIG. 1 to depict friction hinges connecting the support component to a chassis of the electronic device in accordance with one example.

FIG. 6 is an exploded rear view of the electronic device 102 to show the attachment of the chassis 112 and the support component 110 in greater detail. In this example, the electronic device 102 includes friction hinges 602a and 602b, each of which may be instances of one of the friction hinges described herein, including, for instance, the hinge 114 of FIG. 1. In this case, the chassis 112 includes a respective opening 604 in which one of the friction hinges 602a, 602b is disposed. A base or frame 606 of the hinges 602a, 602b may thus be disposed internally in the chassis 112. In this example, each frame 606 is fixedly attached to the chassis 112. The attachment may be direct or indirect. Each hinge 602a, 602b may include a hinge leaf 608 that, upon pivotal movement of the hinge, extends outward from the frame 606 and, thus, the chassis 112. In this case, the hinge leaf 608 is fixedly attached to the support component 110. In other cases, the locations of the frame 606 and the hinge leaf 608 are reversed.

Each hinge 602a, 602b may include another hinge leaf connected to the chassis 112. In some cases, the other hinge leaf may move (e.g., pivot or otherwise rotate) relative to the chassis 112, examples of which are described below. For instance, each hinge 602a, 602b may include a cam and cam follower arrangement to support movement of the other hinge leaf relative to the frame 606 and the chassis 112, as described below. The cam-based arrangement of each hinge 602a, 602b may be configured to allow the hinge leaf with a friction shaft to rotate about the hinge axis. The movement is relative to the frame 606 and the chassis 112. Such relative movement allows additional portions of the hinge to exit the opening 604, which, in turn, allows further pivoting of the support component 110. In other cases, the other hinge leaf may correspond with the base or frame 606 or other component of the hinge 602a, 602b fixed relative to the chassis 112. Thus, one or both of the support component 110 and the chassis 112 may be attached to pivoting portions of the hinge 602a, 602b.

Figure 7:
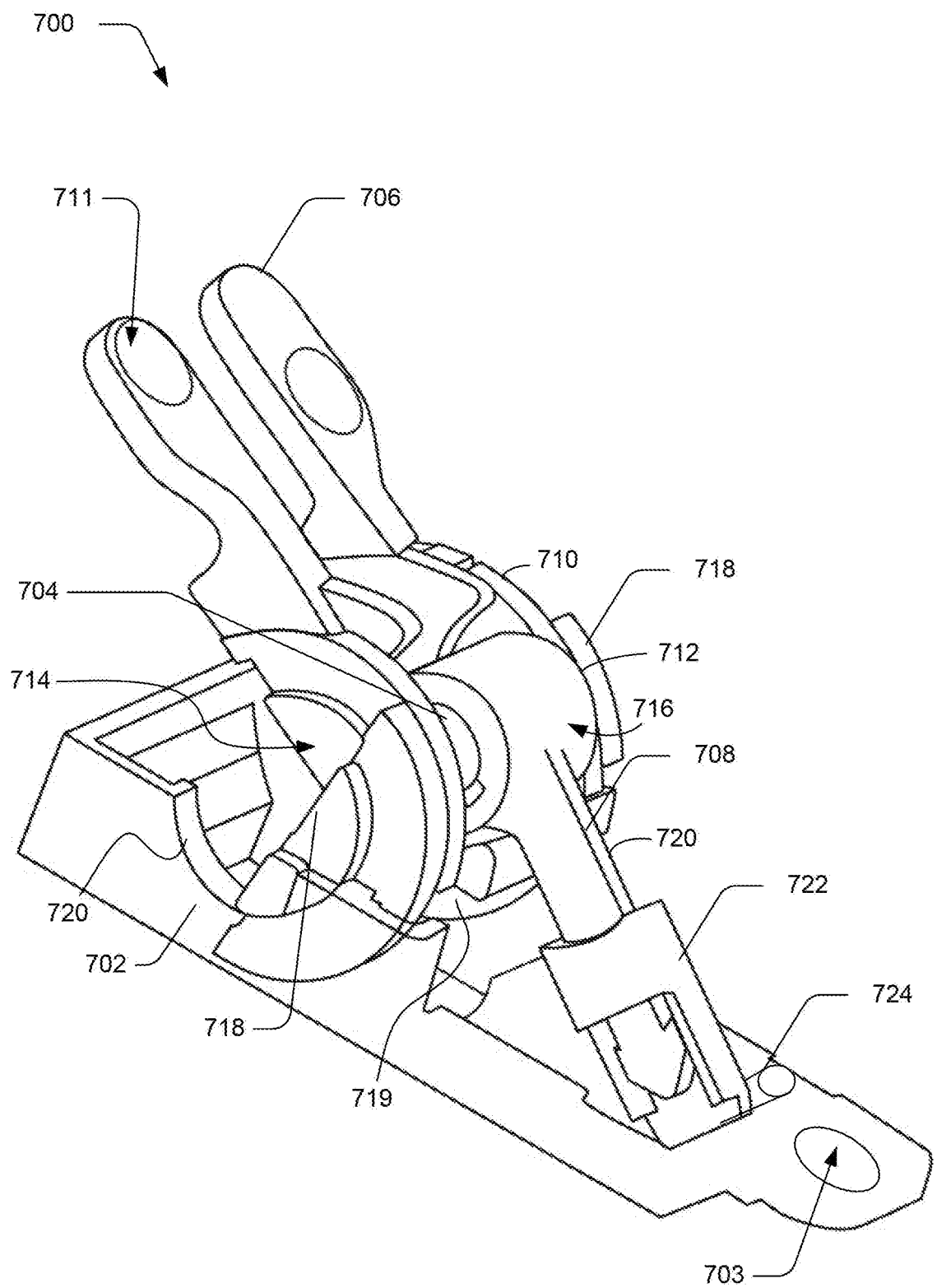
FIG. 7 is a perspective view of a friction hinge in an open orientation in which clutch-based resistance may be implemented in accordance with one example.
Figure 8:
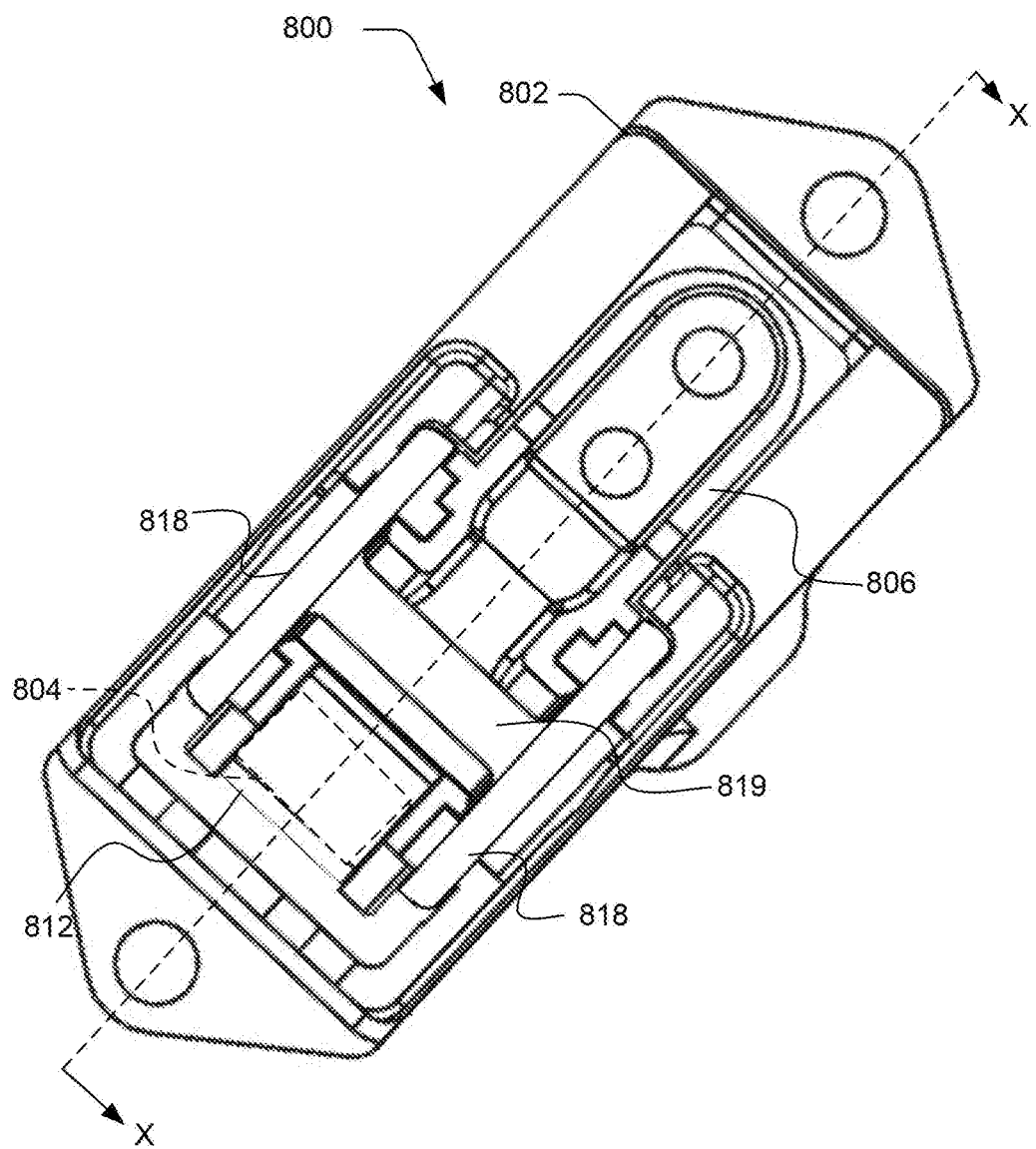
FIG. 8 is a plan view of a friction hinge in a closed orientation in which clutch-based resistance may be implemented in accordance with one example.
Figure 9:
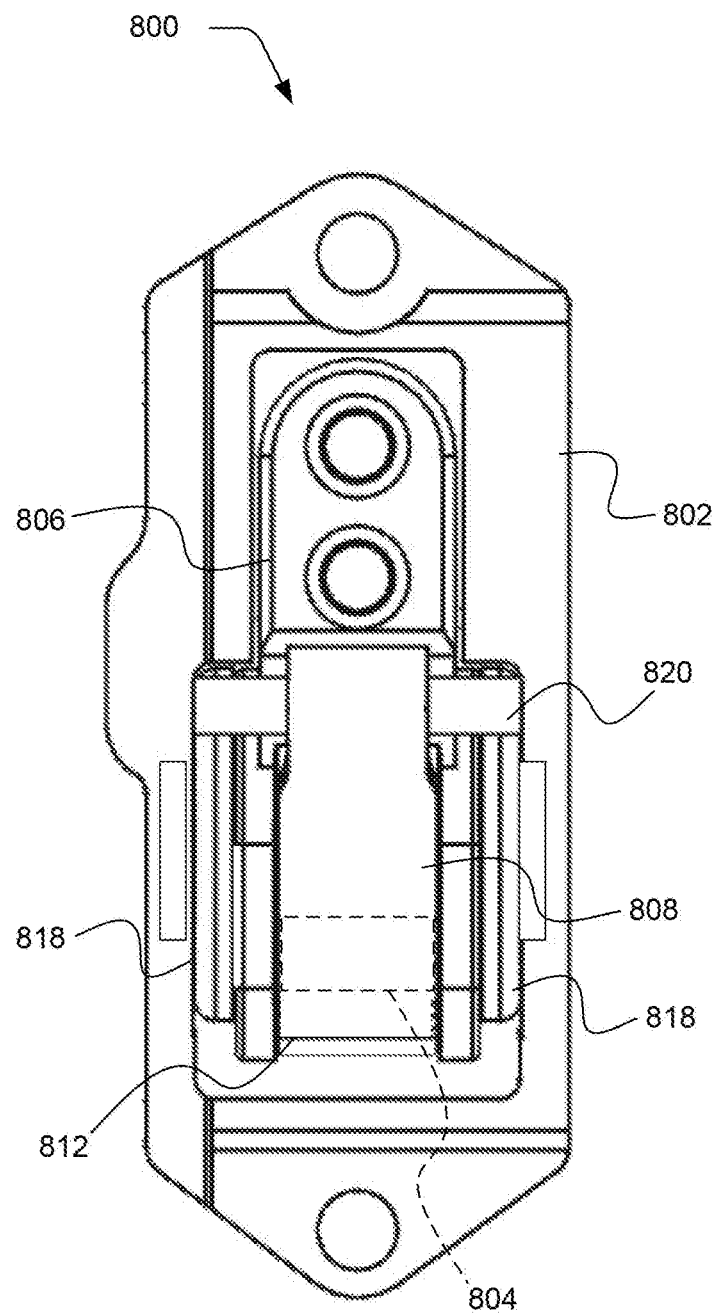
FIG. 9 is a bottom view of the friction hinge of FIG. 8.

FIG. 7 depicts a friction hinge 700 in accordance with one example. The hinge 700 may be used as the hinge 114 (FIG. 1) or the hinges 602a, 602b (FIG. 6) described above. The hinge 700 may also be used in other attachment scenarios. The components of the hinge 700 may be composed of any suitable material and/or combination of materials, such as metals, plastics, polymers, alloys, and so forth.

The hinge 700 includes a hinge frame 702. The hinge frame 702 acts as a base and/or support structure for other components of the hinge 700. For instance, other hinge components may be disposed in the hinge frame 702 when the hinge 700 is disposed in a closed orientation. The hinge 700 is shown in an opened or unfolded orientation. The hinge frame 702 may be mounted to and/or within a device, such as the electronic device 102 (FIG. 1). The hinge frame 702 may include one or more screw holes 703 via which the hinge frame is mounted to a chassis or housing, such as the chassis 112 (FIG. 1) of the electronic device 102 by one or more screws. In this case, the hinge 700 is configured to pivot or rotate into a closed or folded orientation that allows the hinge 700 to be disposed within an opening in the chassis, such as the opening 604 (FIG. 6).

The hinge 700 includes a shaft 704. The shaft 704 defines an axis about which components of the hinge 700 pivot or otherwise rotate. The hinge 700 includes hinge leaves 706, 708 that extend radially outward from the shaft 704. In this case, one of the hinge leaves 706 is fixedly attached to or otherwise engaged with the shaft 704. The hinge leaf 706 may rotate about the shaft 704 in other cases. In the example of FIG. 7, the hinge leaf 706 is linked or attached to the shaft 704 via a plate 710. The plate 710 may be integrally formed with, or otherwise fixed to, the shaft 704. The plate 710 may be engaged to the hinge leaf 706 via a notch and protrusion or other arrangement. Alternatively, the hinge leaf 706 is integrally formed with the shaft 704. The hinge leaf 706 may include one or more screw holes 711 via which the hinge leaf 706 is be mounted to, for instance, a kickstand or other support component or stand, such as the support component 110 (FIG. 1). In this example, the hinge leaf 706 has a central opening to accommodate the hinge leaf 708, which allows the hinge 700 to be substantially flat when disposed in the folded orientation.

The hinge leaf 708 rotates about the shaft 704. The hinge leaf 708 is attached to a band 712 clamped around the shaft 704 for rotation about the shaft 704 and pivotal movement relative to the hinge leaf 706. The band 712 wraps around the shaft 704 in a spring-loaded manner. The spring-loading results in friction between the shaft 704 and the band 712, thereby providing resistance during operation of the hinge 700, as described below.

In the example of FIG. 7, the hinge 700 includes a cam arrangement that defines a center of rotation for the hinge 700. The rotation provided by the cam arrangement displaces the shaft 704. In this case, the displacement moves the shaft 704 away from (e.g., out of) the hinge frame 702. The cam arrangement includes a cam 714 and a cam follower 716. In the example of FIG. 7, the cam 714 includes the hinge leaf 706 and one or more support plates 718 on either side of the hinge leaf 706. The support plates 718, the hinge leaf 706, and the frame 702 are engaged with one another via a set of complementary arced grooves and tracks, as described below. In the example of FIG. 7, the cam follower 716 includes the band 712 and the hinge lead 708.

The support plates 718 are positioned between the hinge frame 702 and the cam 714. An outer surface of each support plate 718 is rotatably engaged with the hinge frame 702. An inner, opposite surface of each support plate 718 is rotatably engaged with the cam 704. The support plates 718 provide lateral support for the hinge 700 in various open positions and enable the hinge 700 to be positioned in various open positions. To that end, the support plates 718 may be connected to one another by a transverse bar 719. In some cases, the transverse bar 719 is integrally formed with the support plates 718. In other cases, the transverse bar 719 is not present, such that the support plates 718 are not connected to one another.

The support plates 718 provide lateral constraint for the hinge leaf 706 and the cam follower 716. In this example, each support plate 718 rides in a respective track 720 formed in the frame 702. The support guides 718 and tracks 720 may have complementary grooves, protrusions, and/or other structures to guide and define the movement of the cam arrangement. In this case, rotation of the hinge leaf 706 relative to the support plates 718 eventually causes the support plates 718 to move along the tracks 720, thereby allowing further rotation of the hinge leaf 706 relative to the frame 702. The support plates 718 and the cam arrangement allow rotation beyond that possible with only, for instance, the hinge leaf 706 and the frame 702. For instance, the hinge leaf 706 and the frame 706 alone may allow 120 degrees of rotation. The support plates 718 and the cam arrangement allow the hinge leaf 706 to further rotate to 165 degrees. The cam arrangement may vary considerably from the example shown.

The cam follower 716 includes the band 712 and the hinge leaf 708. The rotation and movement of the hinge leaf 706 in accordance with the cam arrangement also moves the hinge shaft 704. In this example, the movement of the cam arrangement moves the hinge shaft 704 away from the hinge frame 702. The band 712 and the hinge leaf 708 thus follow the movement of the hinge shaft 704, to act as the cam follower 716 of the cam arrangement.

In the example of FIG. 7, the hinge leaf 708 includes a link 720. The link 720 and the hinge leaf 708 may be integrally formed with, or otherwise attached to, the band 712. The link 720 is engaged with an anchor link 722 of the hinge 700. In this case, the links 720, 722 are slidably engaged with one another. The link 722 may have a slot in which the link 720 is disposed. The link 720 may thus be considered a telescoping link. In other cases, the hinge leaf 708 or the link 720 may be engaged with the link 722 in a different manner (e.g., rotatably) or engaged with a different component, such as the frame 702 (e.g., a slide track of the frame 702). The anchor link 714 is pivotally connected with the hinge frame 702 at a first end. The anchor link 714 may include a rod or shaft 724 positioned at or near the first end that rotatably engages the frame 702. The rod is inserted into a cylindrical opening 718 of the hinge frame 702 about which the anchor link 714 rotates.

The hinge shaft 704 and/or other components of the hinge 700 are configured to provide a desired level of resistance during rotation of the hinge 700. For example, the resistance is provided via friction between the hinge shaft 704 and the band 712. The amount of friction and, thus, the level of resistance may be different depending on the direction of hinge movement. In some cases, opening the hinge 700 involves a higher resistance level. Closing the hinge 700 then involves a resistance level lower than that used to open the hinge 700. In other cases, other differences in resistance levels may be provided. For instance, opening the hinge may have a lower resistance level than closing the hinge. In any case, the hinge 700 may include a collar disposed between the shaft 704 and the band 712 to provide a clutch or other locking mechanism that establishes the differences in resistance levels. Further details regarding the clutch or locking mechanism are set forth below in connection with a number of examples.

Figure 10:
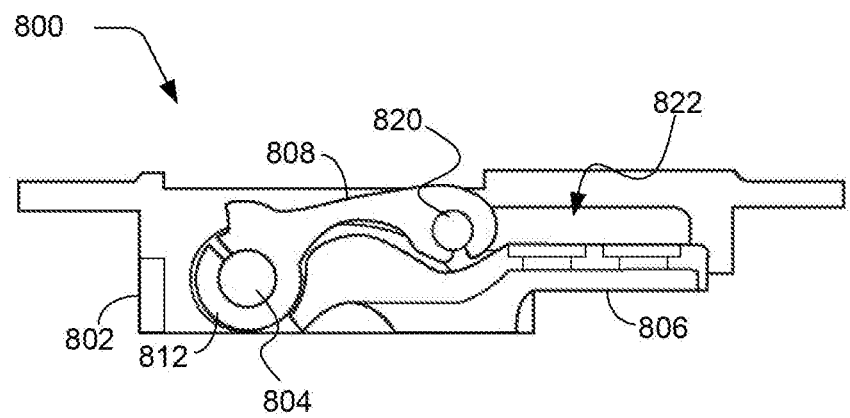
FIGS. 10 and 11 are sectional views of the friction hinge of FIG. 8 in closed and open orientations, respectively, the sectional views taken along line X-X of FIG. 8.
Figure 11:
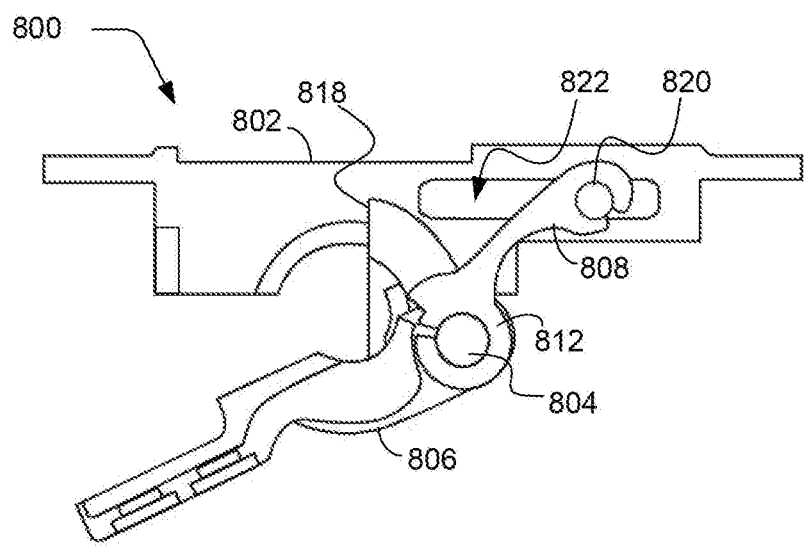

FIGS. 8-11 depict a friction hinge 800 in accordance with one example. The friction hinge 800 is disposed in a closed (or folded) orientation. The friction hinge 800 is similar in many respects to the hinge 700 of FIG. 7. For instance, the hinge 800 has a number of the same components, including, for example, a frame 802, a shaft 804 (shown in phantom), a leaf 806, a leaf 808 (FIGS. 9-11), a band 812 clamped around the shaft 804 and from which the leaf 808 extends, and a cam arrangement involving the leaves 806, 808 and support plates 818 connected by a transverse bar 819 (FIG. 8) as described above. In this case, the shaft 804 and the leaf 806 are integrally formed or otherwise directly connected with one another. Other differences may be present without affecting the components involved in establishing the resistance levels. For instance, the frame 802 and the leaves 806, 808 may be shaped differently, and the leaf 808 engages the frame 802 via a pin 820 (FIGS. 9-11) sliding in a track 822 (FIGS. 10 and 11). These and other differences notwithstanding, the manner in which the resistance levels are established remains the same. The following description of the hinge 800 is thus applicable to the other hinges described herein.

Figure 12:
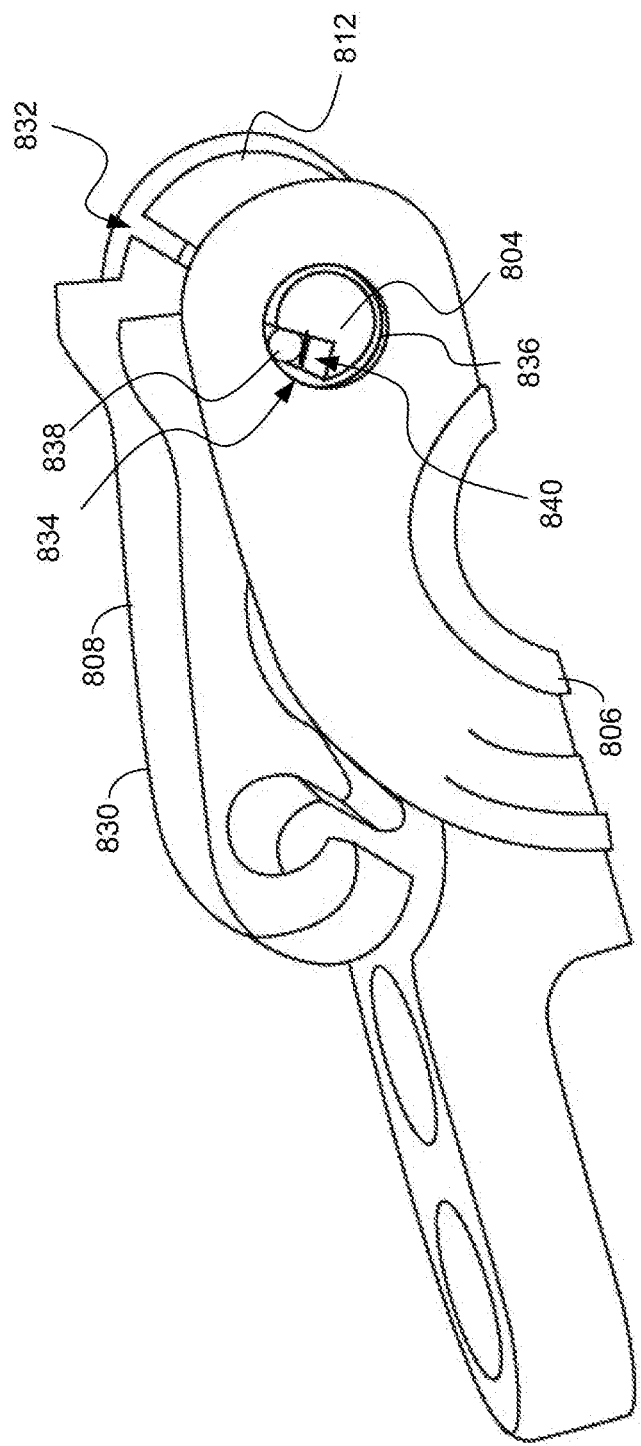
FIG. 12 is a partial, perspective view of the friction hinge of FIG. 8 to depict a clutch of the friction hinge in accordance with one example.

FIG. 12 depicts the friction hinge 800 in greater detail. Several components of the hinge 800 are not shown in FIG. 12 to better depict the hinge leaves 806, 808, and the band 812 clamped around the shaft 804. In this case, the hinge leaf 808 includes a link 830 extending from, and integrally formed with, the band 812. The shaft 804 is sized such that the band 812 is left with a gap 832 extending along an axial length of the band 812. As a result, the band 812 is clamped around the shaft 804 to form a cantilever spring about the shaft 804. The spring loading of the band 812 about the shaft 804 applies a clamping force to establish friction between the band 812 and the shaft 804. The band 812 may be configured differently. For example, the band 812 may not include the gap 832, thereby completely encircling the shaft 804. Alternatively or additionally, the band 812 has one or more relief cuts formed therein that do not fully separate the band 812.

The clamping force may be accented when opening the hinge 800. Moving one or both of the leaves 806, 808 in an opening direction tends to close the gap 832 in the band 812. Opening the hinge 800 may thus increase the level of resistance provided by the friction. Closing the hinge 800 tends to open the gap 832, thereby decreasing the clamping force and, thus, the resistance. Therefore, the friction hinge 800 may already exhibit a difference between the resistance levels exhibited during opening and closing of the hinge 800.

The hinge 800 includes a clutch or locking mechanism 834 to increase the difference in the resistance levels. In this example, the clutch 834 is configured as a roller clutch. To that end, the clutch 834 includes a collar 836 disposed between the shaft 804 and the band 812, and a roller pin 838 disposed in a notch 840 in the shaft 804. The clutch 834 is configured to lock and unlock the collar 836 to the shaft 804. The clutch 834 is configured such that rotation of the band 812 about the shaft 804 in one direction (e.g., a hinge opening direction) locks the collar 836 to the shaft 804 for frictional movement of the band 812 about the shaft 804 at a first resistance level (e.g., a high resistance level). The clutch 834 is further configured such that rotation of the band 812 about the shaft 804 in the other direction (e.g., a hinge closing direction) unlocks the collar 836 from the shaft 804 to allow the collar 836 to rotate about the shaft 804 for frictional movement of the band 812 about the shaft 804 at a second resistance level lower than the first resistance level. In some cases, the resistance level in the opening direction is higher than the resistance level in the closing direction. Closing the hinge 800 may thus be easier than opening the hinge 800. In other cases, the resistance levels may be reversed.

Figure 13:
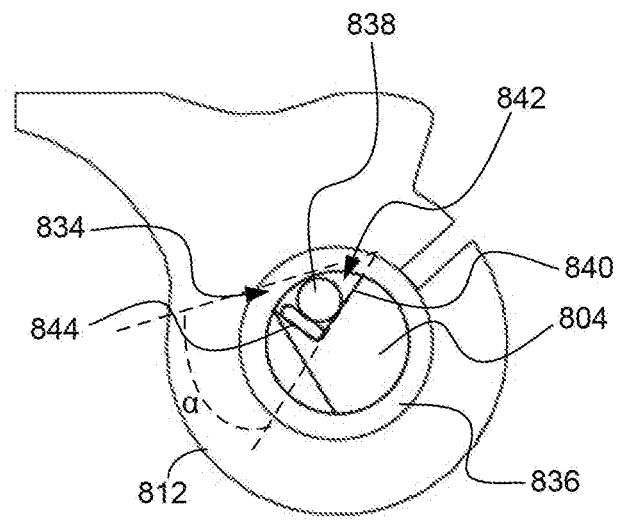
FIG. 13 is a partial, side view of the friction hinge of FIG. 8 to depict the clutch in greater detail.

FIG. 13 depicts the clutch 834, the band 812, and the shaft 804 in greater detail. The notch 840 is asymmetrically shaped such that the roller pin 838 has sufficient room to roll or rotate when the band 812 is rotated in one direction, but insufficient room to roll or rotate when the band 812 is rotated in the other direction. In this example, one side or face of the notch 840 is longer than the other. This asymmetry forms a space 842 opposite the short face too small for the roller pin 838 to rotate. Rotation of the band 812 about the shaft 804 in a direction that rolls the roller pin 838 into that space wedges the roller pin 838 between the collar 836 and the shaft 804 to fix the collar 836 in place relative to the shaft 804. The fixed collar 836 thus results in frictional movement of the band 812 about the shaft 804 at the high or higher resistance level.

The asymmetry of the notch may be established via a wedge angle α of the notch. The wedge angle α is the angle between a tangent line 1300 where the roller pin 838 contacts the collar 836 and a tangent line 1302 where the roller pin 838 contacts the surface of the notch 840. In some cases, the wedge angle is about 8 degrees. The wedge angle may vary. For instance, in some cases, the wedge angle may be offset by a few degrees from 8 degrees. The wedge angle α is depicted in FIG. 13 as a larger angle for ease in illustration.

The clutch 834 includes a spring 844 disposed in the notch 840 to bias the roller pin 838 toward the collar 836 and the space 842. In this case, the spring 844 is a leaf spring, but a variety of spring types may be used. For instance, the spring 844 may be or include a compression spring or a plunger arrangement. Rotation of the band 812 in the other direction (e.g., the closing direction) rolls the roller pin 838 toward the spring 844, compressing the spring 844. The roller pin 838 is thus no longer disposed in the space 842 in which the roller pin 838 is capable of being wedged in place. The rotation thus un-wedges the roller pin 838 to allow the collar 836 to rotate about the shaft 804. The collar 836 may thus rotate with the band 812, thereby eliminating or otherwise lowering the friction therebetween.

The collar 836 and the shaft 804 may be composed of materials or otherwise configured to present an interface with zero or low friction (e.g., low relative to the friction between the band 812 and the shaft 804 and/or the band 812 and the collar 836). Frictional movement of the band about the shaft in the opening direction is thus at a resistance level higher than the resistance level exhibited in the closing direction.

The configuration of the clutch 834 may vary from the example shown. For instance, other notch shapes may be used. Alternatively or additionally, an asymmetry or other irregularity may be formed in the collar 836 (rather than the shaft 804 as shown). Other types of rollers may be used, including, for instance, ball bearings. In still other cases, other types of clutches may be used, including, for instance, Sprag clutches. More than one pin or other roller may be used.

Figure 14:
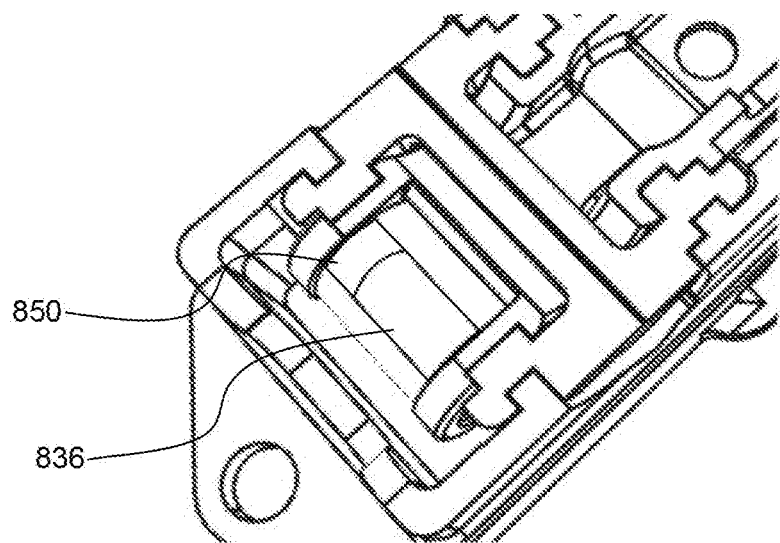
FIG. 14 is a partial, perspective view of the friction hinge of FIG. 8 with a band removed to depict components of the clutch in greater detail.

FIG. 14 depicts the hinge 800 with the band 812 and the leaf 808 removed to depict the configuration of the clutch 834 and the shaft 804. The configuration of the clutch 834 also allows the hinge 800 to be designed, i.e., tuned, to exhibit a desired difference in the opening and closing resistance levels and, ultimately, to achieve a desired feel or response. To that end, the collar 836 is not as wide as the band 812. The collar 836 is thus not disposed between the band 812 and the shaft 804 for a portion of the axial length (or width) of the band 812. As shown in FIG. 14, the collar 836 has a shorter width, leaving a portion or section 850 of the shaft 804 to form an interface with the band 812. The band 812 is thus frictionally engaged with the shaft 804 in the portion 850. The shaft 804 may be composed of one or more materials or otherwise configured to act as a friction shaft, thereby establishing resistance due to high friction between the shaft 804 and the band 812.

The relative widths (or axial lengths) of the portion 850 of the shaft 804 and the collar 836 determine the amount of resistance exhibited when the locking mechanism, or clutch, is unlocked. Instead of turning completely freely (i.e., zero or near zero resistance), the closing resistance may exhibit a non-zero resistance level. For instance, if the width of the shaft portion 850 is 25% of the overall width of the band 812, the lower resistance level (e.g., for the closing direction) may be about 25% of the resistance level in the other direction (e.g., the opening direction).

The relative widths may be adjusted to tune the closing resistance to a desired level. The desired, non-zero resistance level may nonetheless remain substantially below the resistance level exhibited by the other direction (e.g., the opening direction).

Figure 15:
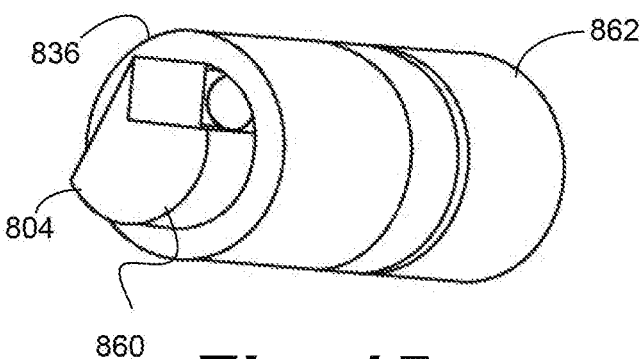
FIG. 15 is a partial, perspective view of the friction hinge of FIG. 8 to depict a shaft of the friction hinge in accordance with one example.

As shown in FIG. 15, the shaft 804 may have a non-uniform cross-section to accommodate the collar 836. A first section 860 of the shaft 804 about which the collar 836 is disposed may have a smaller diameter than a second section 862. In this case, the shaft 804 has a step-down in diameter at the interface between the sections 860, 862. Other shaft configurations may be used, including, for instance, configurations in which the shaft 804 and/or the collar 836 vary in other ways.

Figure 16:
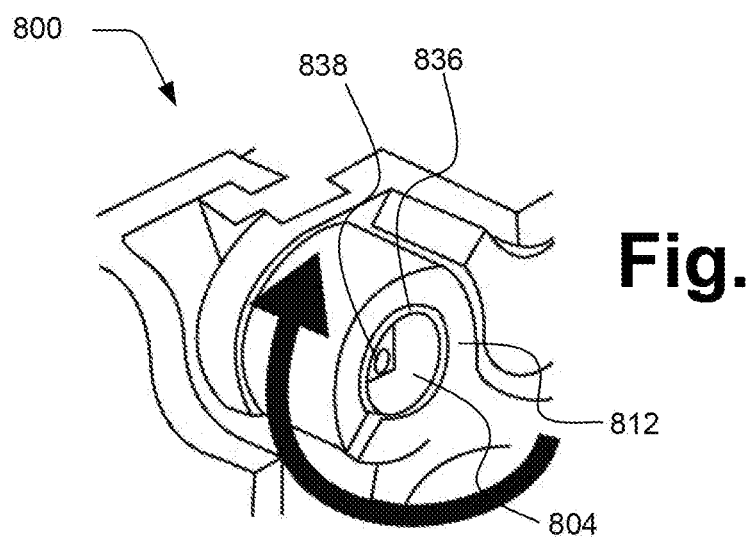
FIG. 16 is a partial, perspective view of the friction hinge of FIG. 8 during operation in which the friction hinge presents a higher resistance level when turned in an opening direction.
Figure 17:
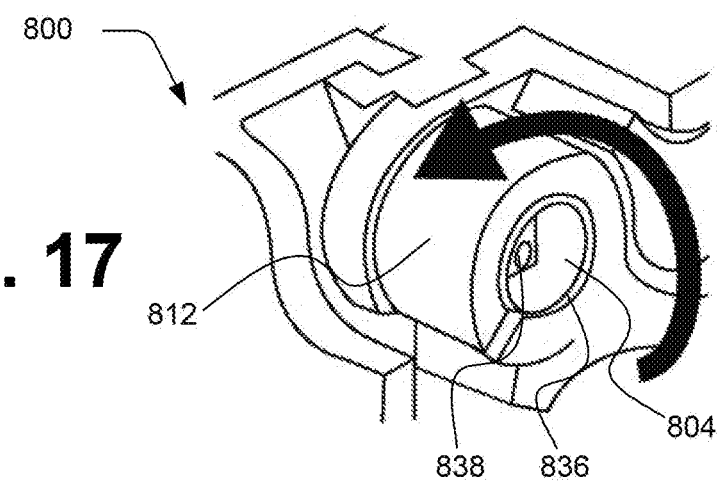
FIG. 17 is a partial, perspective view of the friction hinge of FIG. 8 during operation in which the friction hinge presents a lower resistance level when turned in a closing direction.

FIGS. 16 and 17 depict the operation of the hinge 800 in an example in which the closing resistance level is lower than the opening resistance level. FIG. 16 shows rotation of the hinge 800 in the opening direction. During opening, the band 812 rotates clockwise around the friction shaft 804 and the collar 836. The collar 836 rotates clockwise with the band 812, which causes the roller pin 838 to wedge against the shaft 804 and the collar 836. The wedging locks the collar 836 and the shaft 804 together, at which point the band 812 is rotating around the collar 836, creating friction for rotation with a high (or relatively high) resistance level.

During closing, the band 812 rotates counter-clockwise around the shaft 804 and the collar 836. The collar 836 rotates counter-clockwise with the band 812, which causes the roller pin 838 to un-wedge from the shaft 804 and the collar 836. This un-wedging unlocks the collar 836 and the shaft 804, at which point the collar 836 is rotating with the band 812. The collar 836 may thus be rotating freely around the shaft 804. Such rotation effectively reduces the friction and, thus, the resistance level of the hinge 800 to almost zero. In examples with a kickstand or other stand attached to the hinge 800, the stand may thus be closed with low (or relatively low) torque applied to the stand.

Figure 18:
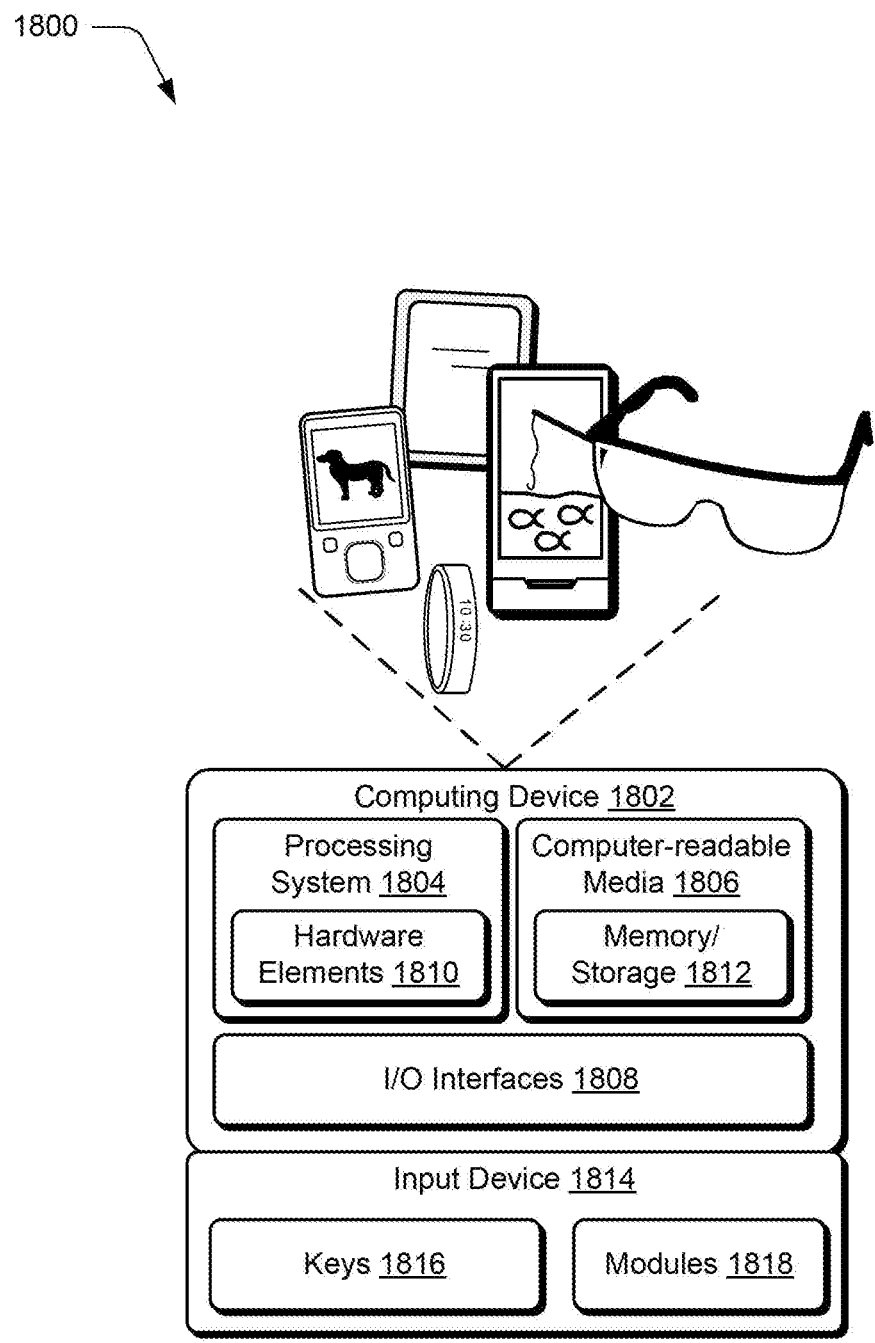
FIG. 18 is a block diagram of a computing device in which one or more friction hinges may be incorporated in accordance with one example.

FIG. 18 depicts an example system 1800 that includes an example computing device 1802 that is representative of one or more computing systems and/or devices that may implement the various techniques described herein. In at least some implementations, the computing device 1802 represents an implementation of the computing device 102 discussed above. The computing device 1802 may be, for example, be configured to assume a mobile configuration through use of a housing formed and sized to be grasped and carried by one or more hands of a user, illustrated examples of which include a mobile phone, mobile game and music device, and tablet computer although other examples are also contemplated. In at least some implementations, the computing device 102 may be implemented as a wearable device, such as a smart watch, smart glasses, and so forth.

The example computing device 1802 as illustrated includes a processing system 1804, one or more computer-readable media 1806, and one or more I/O interface 1808 that are communicatively coupled, one to another. Although not shown, the computing device 1802 may further include a system bus or other data and command transfer system that couples the various components, one to another. A system bus may include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1804 is representative of functionality to perform one or more operations using hardware. Accordingly, the processing system 1804 is illustrated as including hardware element 1810 that may be configured as processors, functional blocks, and so forth. This may include implementation in hardware as an application specific integrated circuit or other logic device formed using one or more semiconductors. The hardware elements 1810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1806 is illustrated as including memory/storage 1812. The memory/storage 1812 represents memory/storage capacity associated with one or more computer-readable media. The memory/storage component 1812 may include volatile media (such as random access memory (RAM)) and/or nonvolatile media (such as read only memory (ROM), Flash memory, optical disks, magnetic disks, and so forth). The memory/storage component 1812 may include fixed media (e.g., RAM, ROM, a fixed hard drive, and so on) as well as removable media (e.g., Flash memory, a removable hard drive, an optical disc, and so forth). The computer-readable media 1806 may be configured in a variety of other ways as further described below.

Input/output interface(s) 1808 are representative of functionality to allow a user to enter commands and information to computing device 1802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1802 may be configured in a variety of ways to support user interaction.

The computing device 1802 is further illustrated as being communicatively and physically coupled to an input device 1814 that is physically and communicatively removable from the computing device 1802. In this way, a variety of different input devices may be coupled to the computing device 1802 having a wide variety of configurations to support a wide variety of functionality. In this example, the input device 1814 includes one or more keys 1816, which may be configured as pressure sensitive keys, mechanically switched keys, and so forth.

The input device 1814 is further illustrated as include one or more modules 1818 that may be configured to support a variety of functionality. The one or more modules 1818, for instance, may be configured to process analog and/or digital signals received from the keys 1816 to determine whether a keystroke was intended, determine whether an input is indicative of resting pressure, support authentication of the input device 1814 for operation with the computing device 1802, and so on.

Various techniques may be described herein in the general context of software, hardware elements, or program modules. Such modules may include routines, programs, objects, elements, components, data structures, and so forth that perform particular tasks or implement particular abstract data types. The terms "module," "functionality," and "component" may be used herein to represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1802. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1802, such as via a network. Signal media may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1810 and computer-readable media 1806 are representative of modules, programmable device logic and/or fixed device logic implemented in a hardware form that may be employed in some examples to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1810. The computing device 1802 may be configured to implement particular instructions and/or functions corresponding to the software and/or hardware modules. Accordingly, implementation of a module that is executable by the computing device 1802 as software may be achieved at least partially in hardware, e.g., through use of computer-readable storage media and/or hardware elements 1810 of the processing system 1804. The instructions and/or functions may be executable/operable by one or more articles of manufacture (for example, one or more computing devices 1802 and/or processing systems 1804) to implement techniques, modules, and examples described herein.

Described above are friction hinges having a locking mechanism, such as a clutch. The locking mechanism may be configured to establish a low or lower resistance level during hinge closing (or folding). The locking mechanism may include a locking roller, or other wedge mechanism, to form a one-way clutch. The locking mechanism may be used in conjunction with a rigid shaft to tune the closing resistance level to a desired level. The locking mechanism may be integrated into a hinge having a cam arrangement and other aspects suitable for use in connection with electronic devices. No additional space is consumed by the locking mechanism. The hinge may thus remain well suited for mounting within, for instance, an opening in a chassis, as described above.

In one aspect, a hinge includes a shaft, a hinge leaf engaged with the shaft, a band clamped around the shaft for rotation about the shaft and pivotal movement relative to the hinge leaf, and a clutch disposed between the band and the shaft, the clutch including a collar disposed between the shaft and the band, the clutch being configured to lock and unlock the collar to the shaft. The clutch is configured such that rotation of the band about the shaft in a first direction locks the collar to the shaft for frictional movement of the band about the shaft at a first resistance level. The clutch is further configured such that rotation of the band about the shaft in a second direction unlocks the collar from the shaft for frictional movement of the band about the shaft at a second resistance level lower than the first resistance level.

In another aspect, a hinge includes a shaft, a cam attached to the shaft, the cam including a hinge leaf extending radially outward from the shaft, a cam follower including a band, the band rotatably clamped around the shaft for rotation about the shaft and pivotal movement relative to the cam, and a clutch disposed between the collar and the shaft, the clutch comprising a collar disposed between the shaft and the band. The clutch is configured such that rotation of the band about the shaft in a first direction locks the collar to the shaft for frictional movement of the band about the shaft at a first resistance level. The clutch is further configured such that rotation of the band about the shaft in a second direction unlocks the collar from the shaft to allow the collar to rotate about the shaft for frictional movement of the band about the shaft at a second resistance level lower than the first resistance level.

In yet another aspect, an electronic device includes a chassis, a stand supporting the chassis, and a hinge pivotably attaching the chassis and the stand. The hinge includes a shaft including a notch, a band clamped around the shaft for rotation about the shaft, a collar disposed between the shaft and the band, and a pin disposed in the notch. Rotation of the band about the shaft in a first direction wedges the pin between the collar and the shaft to fix the collar in place for frictional movement of the band about the shaft at a first resistance level. Rotation of the band about the shaft in a second direction un-wedges the pin to allow the collar to rotate about the shaft for frictional movement of the band about the shaft at a second resistance level lower than the first resistance level.

In connection with any one of the aforementioned aspects, the hinges and devices described herein may alternatively or additionally include any combination of one or more of the following aspects or features. The collar is not disposed between the band and the shaft for a portion of an axial length of the band. The shaft has a first section and a second section with a smaller diameter than the first section. The collar is disposed in the second section and not disposed in the first section. The band is frictionally engaged with the shaft in the first section. The band includes a gap that extends an axial length of the band to form a cantilever spring about the shaft. The hinge further includes a link extending from, and integrally formed with, the band. The clutch includes a roller pin. The shaft includes a notch in which the roller pin is disposed. The hinge further includes a spring disposed in the notch to bias the roller pin toward the collar. The hinge leaf is configured as part of a cam arrangement. The hinge further includes a cam attached to the shaft. The hinge further includes a link extending radially outward from the band, the link and the band acting as a cam follower relative to the cam.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A hinge comprising:
    a shaft;
    a hinge leaf engaged with the shaft;
    a band clamped around the shaft for rotation about the shaft and pivotal movement relative to the hinge leaf; and
    a locking mechanism disposed between the band and the shaft, the locking mechanism comprising a collar disposed between the shaft and the band, the locking mechanism being configured to lock and unlock the collar to the shaft;

wherein the locking mechanism is configured such that rotation of the band or the shaft in a first clockwise direction locks the collar to the shaft for frictional movement of the band about the shaft at a first resistance level, and wherein the locking mechanism is further configured such that rotation of the band about the shaft in a second counter-clockwise direction different from the first clockwise direction unlocks the collar from the shaft for frictional movement of the band about the shaft at a second resistance level lower than the first resistance level, wherein the first clockwise direction is relative to a view of a first end of the shaft, and the second counter-clockwise direction is relative to the view of the first end of the shaft.

2. The hinge of claim 1, wherein the collar is not disposed between the band and the shaft for a portion of an axial length of the band.

3. The hinge of claim 1, wherein:
the shaft has a first section and a second section with a smaller diameter than the first section; and
the collar is disposed in the second section and not disposed in the first section.

4. The hinge of claim 3, wherein the band is frictionally engaged with the shaft in the first section.

5. The hinge of claim 1, wherein the band comprises a gap that extends an axial length of the band to form a cantilever spring about the shaft.

6. The hinge of claim 1, wherein the locking mechanism comprises a roller pin.

7. The hinge of claim 6, wherein the shaft comprises a notch in which the roller pin is disposed.

8. The hinge of claim 7, further comprising a spring disposed in the notch to bias the roller pin toward the collar.

9. The hinge of claim 1, wherein the hinge leaf is configured as part of a cam arrangement.

10. A hinge comprising:
a shaft;
a cam attached to the shaft, the cam comprising a hinge leaf extending radially outward from the shaft;
a cam follower comprising a band, the band rotatably clamped around the shaft for rotation about the shaft and pivotal movement relative to the cam; and
a clutch disposed between the band and the shaft, the clutch comprising a collar disposed between the shaft and the band;
wherein the clutch is configured such that rotation of the band about the shaft in a first counter-clockwise direction locks the collar to the shaft for frictional movement of the band about the shaft at a first resistance level,
wherein the clutch is further configured such that rotation of the band about the shaft in a second clockwise direction different from the first counter-clockwise direction unlocks the collar from the shaft to allow the collar to rotate about the shaft for frictional movement of the band about the shaft at a second resistance level lower than the first resistance level, and wherein unlocking the collar from the shaft includes complete decoupling from the shaft.

11. The hinge of claim 10, wherein the collar is not disposed between the band and the shaft for a portion of an axial length of the band.

12. The hinge of claim 10, wherein:
the shaft has a first section and a second section with a smaller diameter than the first section; and
the collar is disposed in the second section and not disposed in the first section.

13. The hinge of claim 10, wherein the clutch comprises a roller pin.

14. An electronic device comprising:
a chassis;
a stand supporting the chassis; and
a hinge pivotably attaching the chassis and the stand, the hinge comprising:
a shaft comprising a notch;
a band clamped around the shaft for rotation about the shaft;
a collar disposed between the shaft and the band; and
a roller pin disposed in the notch;
wherein rotation of the band about the shaft in a first clockwise direction wedges the roller between the collar and the shaft to fix the collar in place for frictional movement of the band about the shaft at a first resistance level, and
wherein rotation of the band about the shaft in a second counter-clockwise direction different from the first clockwise direction un-wedges the roller pin to allow the collar to rotate about the shaft for frictional movement of the band about the shaft at a second resistance level lower than the first resistance level, wherein the first clockwise direction is relative to a first end of the shaft, and the second counter-clockwise direction is relative to the first end of the shaft.

15. The electronic device of claim 14, wherein the collar is not disposed between the band and the shaft for a portion of an axial length of the band.

16. The electronic device of claim 14, wherein:
the shaft has a first section and a second section with a smaller diameter than the first section; and
the collar is disposed in the second section and not disposed in the first section.

17. The electronic device of claim 14, wherein the hinge further comprises a cam attached to the shaft.

18. The electronic device of claim 17, wherein the hinge further comprises a link extending radially outward from the band, the link and the band acting as a cam follower relative to the cam.

19. The claim 1, wherein unlocking the collar from the shaft includes complete decoupling from the shaft.

20. The hinge of claim 10, wherein the first clockwise direction is relative to a view of a first end of the shaft, and the second counter-clockwise direction is relative to the view of the first end of the shaft.

* * * * *